(12) United States Patent
Suh (10) Patent No.: US 7,719,936 B2
(45) Date of Patent: May 18, 2010

(54) RECORDING MEDIUM, AND METHOD AND APPARATUS FOR RECORDING DATA IN THE RECORDING MEDIUM

(75) Inventor: Sang Woon Suh, Seoul (KR)

(73) Assignee: LG Electronics, Inc., Seoul (KR)

( * ) Notice: Subject to any disclaimer, the term of this patent is extended or adjusted under 35 U.S.C. 154(b) by 850 days.

(21) Appl. No.: 11/224,239

(22) Filed: Sep. 13, 2005

(65) Prior Publication Data

US 2006/0055989 A1    Mar. 16, 2006

Related U.S. Application Data

(60) Provisional application No. 60/608,900, filed on Sep. 13, 2004.

(30) Foreign Application Priority Data

Mar. 18, 2005    (KR)    ............. 10-2005-0022809

(51) Int. Cl.
  *G11B 7/00* (2006.01)
(52) U.S. Cl. ............. 369/47.53; 369/53.17; 369/116; 369/47.19
(58) Field of Classification Search .............. None
  See application file for complete search history.

(56) References Cited

U.S. PATENT DOCUMENTS

| | | | | |
|---|---|---|---|---|
| 5,706,271 | A * | 1/1998 | Hashimoto | ............. 369/53.37 |
| 2002/0098806 | A1 | 7/2002 | Park | |
| 2004/0174793 | A1* | 9/2004 | Park et al. | ............. 369/59.25 |
| 2005/0078578 | A1 | 4/2005 | Sasaki | |

FOREIGN PATENT DOCUMENTS

| | | |
|---|---|---|
| JP | 2001-273637 | 10/2001 |
| JP | 2003-132538 | 5/2003 |
| RU | 2005-120662 | 1/2006 |
| WO | WO 03/046898 A1 | 6/2003 |
| WO | WO 2004/097813 | 11/2004 |

OTHER PUBLICATIONS

International Search Report mailed Feb. 7, 2006 in corresponding International Patent Application No. PCT/KR2005/003000.
Extended Search Report issued May 12, 2009 by the European Patent Office in counterpart European Patent Application No. 05787113.9-2210.
Office Action issued Jun. 8, 2009 by the Russian Patent Office in counterpart Russian Patent Application No. 2007106066/28 (with English language translation).

* cited by examiner

*Primary Examiner*—Jorge L Ortiz Criado
(74) *Attorney, Agent, or Firm*—Harness, Dickey & Pierce, P.L.C.C.

(57) ABSTRACT

A physical structure suitable for a recording medium such as a BD, and a method and apparatus for recording data in the recording medium using the physical structure are disclosed. The recording medium includes an inner area, a data area, and an outer area. The recording medium includes a test area contained in at least one of the inner area and the outer area, and a management area for storing a position information indicating a position available for testing in the test area, wherein the position information includes a start position of first data unit available for testing and a position of second data unit available for testing, wherein one or more second data units comprise first data unit. Therefore, the recording medium can be applied to a method for manufacturing a BD, and a disc test process and data recording/reproducing operations can be effectively performed.

19 Claims, 11 Drawing Sheets

| Data frame | Byte position in data frame | Contents |
|---|---|---|
| | | |
| 31 | 1088 | Next available PSN of test zone on L0 |
| 31 | 1092 | Next available PSN of test zone on L1 |
| 31 | 1096 | The number of AUNs used by the last cluster during current OPC process |
| | | |

FIG. 1

PIC: Permanent Information & Control data
OPC: Optimum Power Control
TDMA: Temporary Disc Management Area
OTA: Outer Testing Area

| Data frame | Byte position in data frame | Contents |
|---|---|---|
| 31 | 1088 | Next available PSN of test zone on L0 |
| 31 | 1092 | Next available PSN of test zone on L1 |
| 31 | 1096 | The number of AUNs used by the last cluster during current OPC process |

FIG. 5B

| Data frame | Byte position in data frame | Contents |
|---|---|---|
| 31 | 1088 | Next available PSN of test zone on L0 |
| 31 | 1092 | Next available PSN of test zone on L1 |
| 31 | 1096 | The number of sync-frames used by the last cluster during current OPC process |

FIG. 5C

| Data frame | Byte position in data frame | Contents |
|---|---|---|
| 31 | 1088 | Next available PSN of test zone on L0 |
| 31 | 1092 | Next available PSN of test zone on L1 |
| 31 | 1096 | The number of sectors or address used by the last cluster during current OPC process |

RECORDING MEDIUM, AND METHOD AND APPARATUS FOR RECORDING DATA IN THE RECORDING MEDIUM

This application claims the benefit of the Korean Patent Application No. 10-2005-0022809, filed on Mar. 18, 2005, which are hereby incorporated by reference as if fully set forth herein.

This application claims the benefit of U.S. Provisional Application No. 60/608,900, filed on Sep. 13, 2004, in the name of inventor Sang Woon SUH, entitled "NEW INFORMATION ON TDDS FOR OPC AREA IN BD-R", which is hereby incorporated by reference as if fully set forth herein.

BACKGROUND OF THE INVENTION

1. Field of the Invention

The present invention relates to a recording medium, and more particularly to a physical structure efficiently used when manufacturing the recording medium, and a method and apparatus for recording data in the recording medium using the physical structure.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

However, a preferred physical structure for use in the BD has not yet been established, such that many limitations and problems occur in developing a BD-based optical recording/reproducing device.

SUMMARY OF THE INVENTION

Accordingly, the present invention is directed to a recording medium, and a method and apparatus for recording data in the recording medium that substantially obviate one or more problems due to limitations and disadvantages of the related art.

An object of the present invention is to provide a physical structure suitable for a recording medium such as a BD, and a method and apparatus for recording data in the recording medium using the physical structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, A recording medium including an inner area, a data area, and an outer area, includes a test area contained in at least one of the inner area and the outer area, and a management area for storing a position information indicating a position available for testing in the test area, wherein the position information includes a start position of first data unit available for testing and a position of second data unit available for testing, wherein one or more second data units comprise first data unit.

In another aspect of the present invention, there is provided A method for recording data in a recording medium, includes the steps of a) reading a position information of a test area assigned to the recording medium, the position information being included in management information required for recording and/or reproducing of the recording medium, wherein the position information indicates a position available for testing and includes a start position of first data unit available for testing and a position of second data unit available for testing, wherein one or more second data units comprise first data unit, b) performing an Optimum Power Control (OPC) process for calculating an optimum write power in the test area recognized by the position information, and c) recording data in the recording medium using the calculated optimum write power.

In a further aspect of the present invention, there is provided An apparatus for recording data in a recording medium, includes a pickup unit for reading management information including a position information stored in management area, and recording data in the recording medium, wherein the position information indicates a position available for testing and includes a start position of first data unit available for testing and a position of second data unit available for testing, wherein one or more second data units comprise first data unit, and a controller for performing an Optimum Power Control (OPC) process capable of calculating an optimum write power in a test area recognized by the position information, and controlling the pickup unit to record data in the recording medium based on the calculated optimum write power.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A recording medium, and a method and apparatus for recording data in the recording medium according to the present invention will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes.

For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "Optimum Power Control (OPC) area" is indicative of a predetermined area assigned to perform an OPC process in the recording medium. The term "Optimum Power Control (OPC)" is indicative of a predetermined process capable of calculating an optimum write power when recording data in a recordable optical disc.

In other words, if the optical disc is loaded in a specific optical recording/reproducing device, the optical recording/reproducing device repeatedly performs a predetermined process for recording data in the OPC area of the optical disc, and reproducing the recorded data, such that it calculates an optimum write power applicable to the optical disc. Thereafter, the optical recording/reproducing device uses the calculated optimum write power when recording data in the optical disc. Therefore, the OPC area is required for the recordable optical disc.

The term "outer test area" is indicative of a specific area used by an optical recording/reproducing device (or a drive) in the recording medium, and can perform not only the OPC process but also a variety of tests required for the optical recording/reproducing device.

In this case, the OPC area and the outer test area are available for the OPC process. According to the present invention, the OPC area and the outer test area are generally referred to as test zone or test area. It should be noted that the OPC performing in the OPC area can be applied even to the outer test area.

Figure 1:
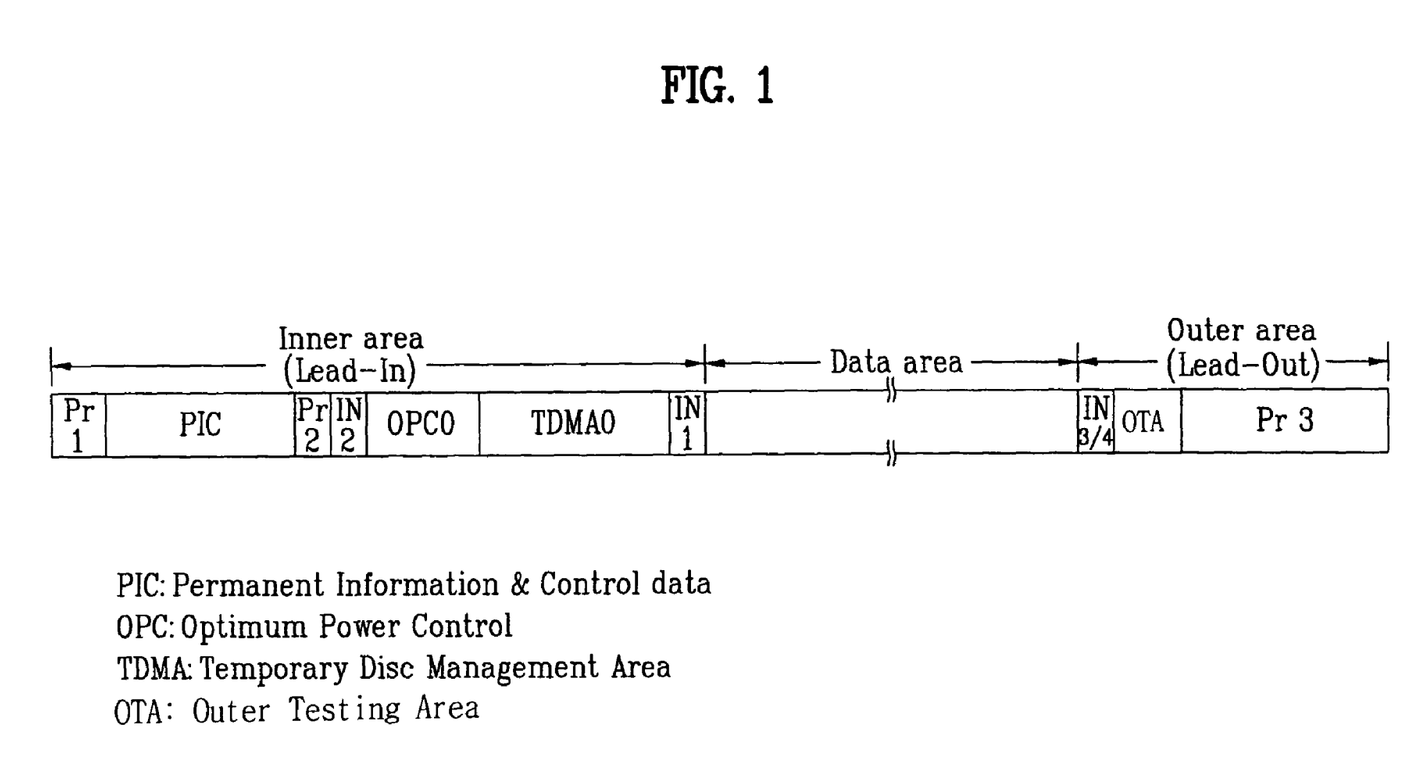
FIG. 1 is a single-layered optical disc structure capable of recording data therein according to the present invention.

FIG. 1 is a single-layered optical disc structure capable of recording data therein according to the present invention. For the convenience of description and better understanding of the present invention, a write-once single-layered BD-R capable of recording data therein is shown in FIG. 1.

Referring to FIG. 1, the optical disc sequentially includes an inner area, a data area, and an outer area on the basis of a disc inner area. A specific area contained in each of the inner area and the outer area is used as either a record area for recording disc management information or a test area. The data area records actual user data therein.

A detailed description of the inner area and the outer area will hereinafter be described. The inner area includes a PIC (Permanent Information & Control data) area, an OPC area, and two information areas (i.e., info-areas) IN1 and IN2. The PIC area records disc management information as an embossed HFM (High Frequency Modulated) signal. The OPC area serving as a test area is adapted to perform the OPC process. The info-areas IN1 and IN2 record various disc management information including a Defect Management Area (DMA).

In this case, a write-once BD-R includes a Temporary Disc Management Area (TDMA) adjacent to the OPC area.

In the case of a detailed structure of the outer area, the outer area includes two other info-areas IN3 and IN4, a outer test area, and a protection area (Pr3).

The BD-R for recording data therein according to the present invention records data in a groove part in a recording layer composed of a land part and the groove part. The groove part is composed of an HFM-groove and a wobbled groove.

Particularly, the wobbled groove is configured in the form of a wobbled shape using a modulation method associated with a sinusoidal wave in a groove contained in a recording layer. The optical recording/reproducing device can read address information (i.e., ADIP: Address In Pre-groove) of a corresponding groove and general disc information using the above-mentioned wobbled shape.

Figure 2:
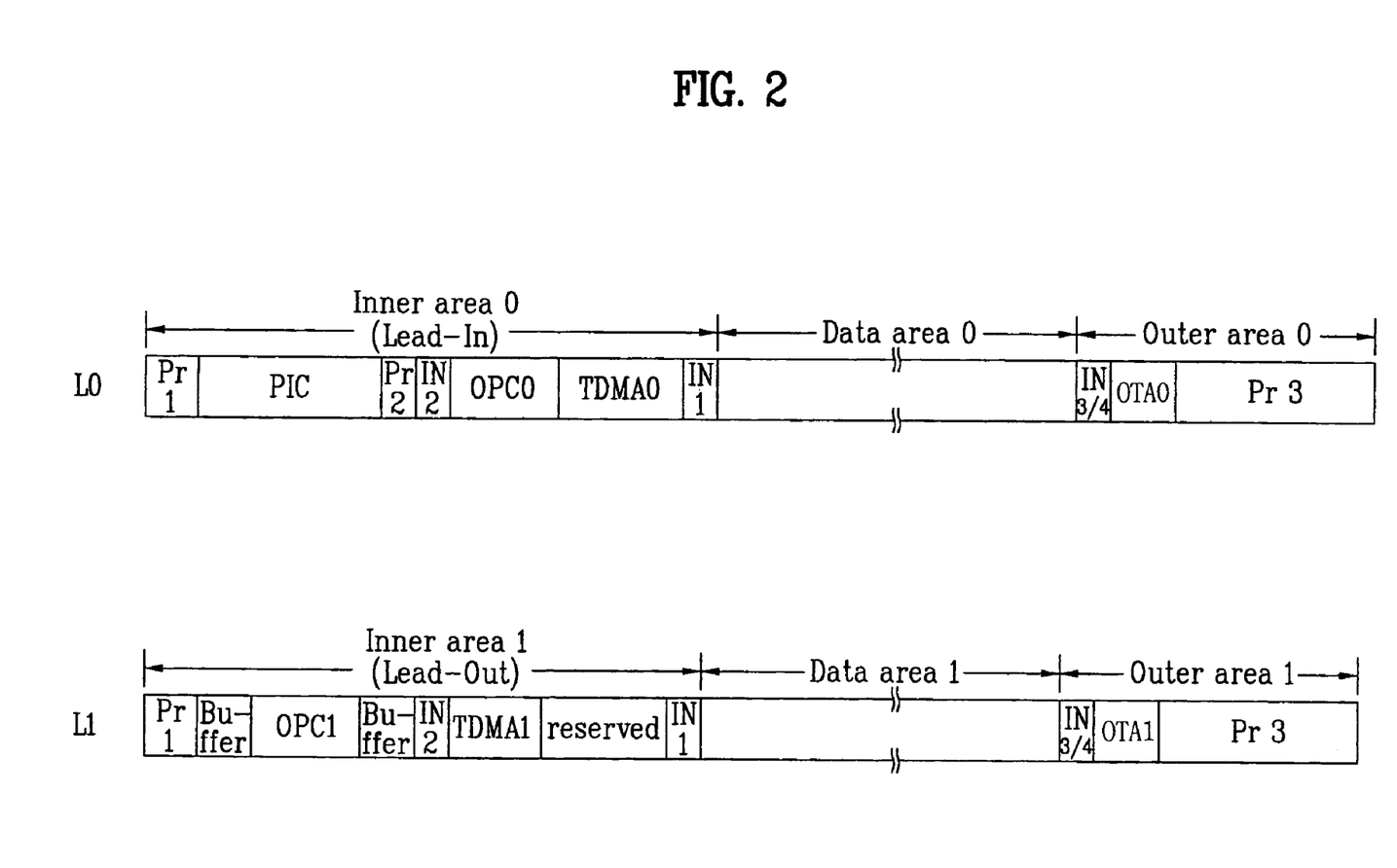
FIG. 2 is a dual-layered optical disc structure capable of recording data therein according to the present invention.

FIG. 2 is a write-once dual-layered optical disc structure capable of recording data therein according to the present invention.

As shown in FIG. 2, one of two recording layers is referred to as a "Layer0 (L0)" layer, and the other one is referred to as a "Layer1 (L1)" layer.

As shown in FIG. 2, individual recording layers have the same structure in the write-once dual-layered BD-R according to the present invention. The inner area of the recording layer L0 includes the OPC area as a test area, and the inter area of the recording layer L1 includes the outer test area as a test area.

Therefore, if the disc is loaded in the optical recording/reproducing device, the optical recording/reproducing device calculates an optimum write power using the OPC process in the OPC area and/or the outer test area. In other words, if the disc is loaded in the optical recording/reproducing device, the optical recording/reproducing device performs the recording/reproducing operation as in the optical disc structure. An area for storing management information of the test area will hereinafter be described.

Figure 3:
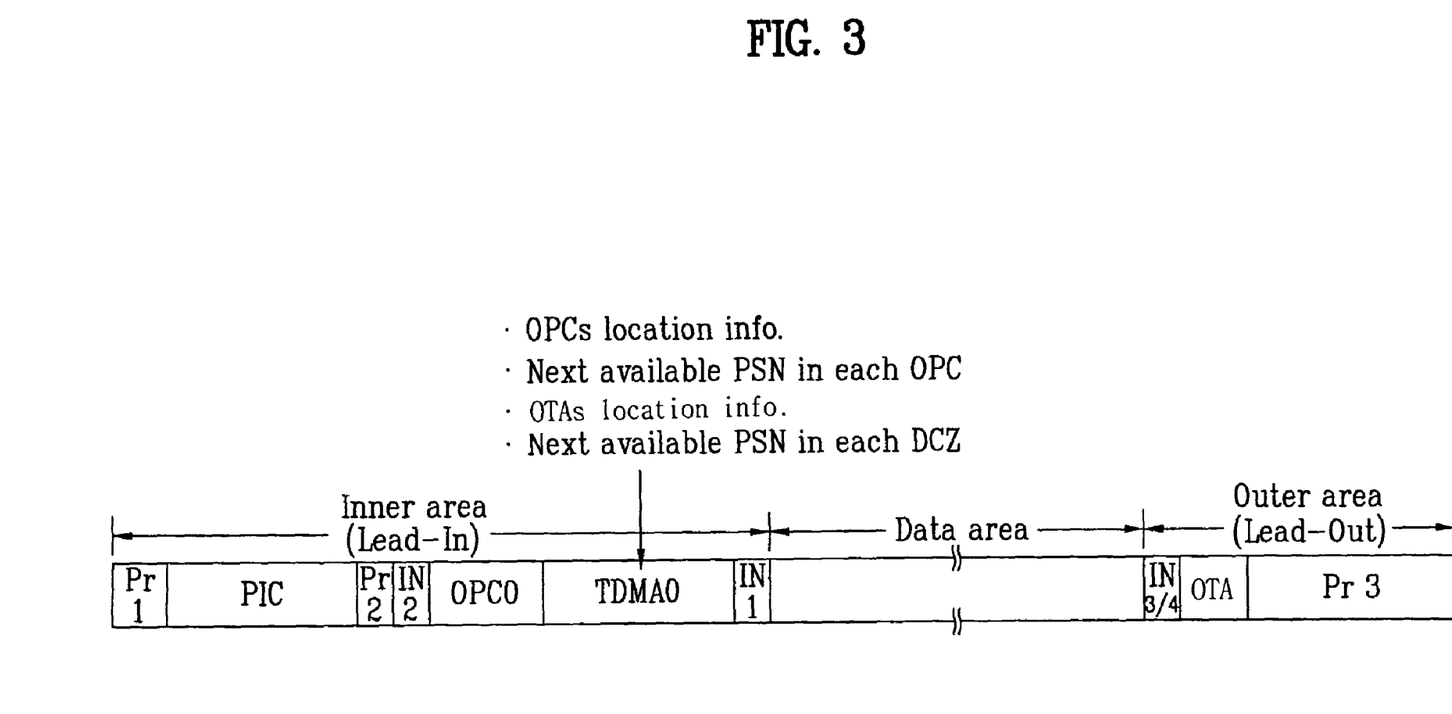
FIG. 3 shows a specific area for recording management information in a recordable optical disc according to the present invention.

FIG. 3 is a conceptual diagram illustrating a method for recording management information in a recordable optical disc.

Referring to FIG. 3, a Temporary DMA (TDMA) is included in the inner area and/or the outer area of the optical disc, and management information for managing the OPC area and the outer test area is recorded in the TDMA. In other words, the write-once recordable disc such as a BD-R records the management information in the TDMA.

In association with the above-mentioned description, the management information of the OPC area and the outer test area may include information indicative of positions of the OPC area and the outer test area for every recording layer of the disc, for example, start address information and/or end address information (i.e., "OPCs location info" and "outer test areas location info"), and information indicative of current available positions in individual OPC and outer test areas (i.e., "Next available PSN in each OPC" and "Next available PSN in each outer test area").

Therefore, if the disc is loaded in the optical recording/reproducing device, the optical recording/reproducing device reads management information of the OPC area and the outer test area contained in the TDMA. Therefore, the optical recording/reproducing device recognizes position information of the OPC area contained in the disc and other position information of the available OPC area, and recognizes position information of the outer test area and other position information of the available outer test area, such that it can perform the OPC process at the recognized positions.

Therefore, it is preferable that the management information be recorded in the TDDS contained in the TDMA.

It is obvious to those skilled in the art that management information associated with the OPC area and the outer test area and available position information of a test area contained in the management information are equally applied to all optical discs shown in FIGS. 1~3. Although the above-mentioned description shows a specific case in which the outer test area is included in the optical disc acting as a recording medium, it should be noted that the present invention can also be applied to not only a recording medium including the OPC and outer test areas acting as test areas but also another recording medium including only the OPC process acting as the test area without departing from the spirit or scope of the inventions.

Figure 4:
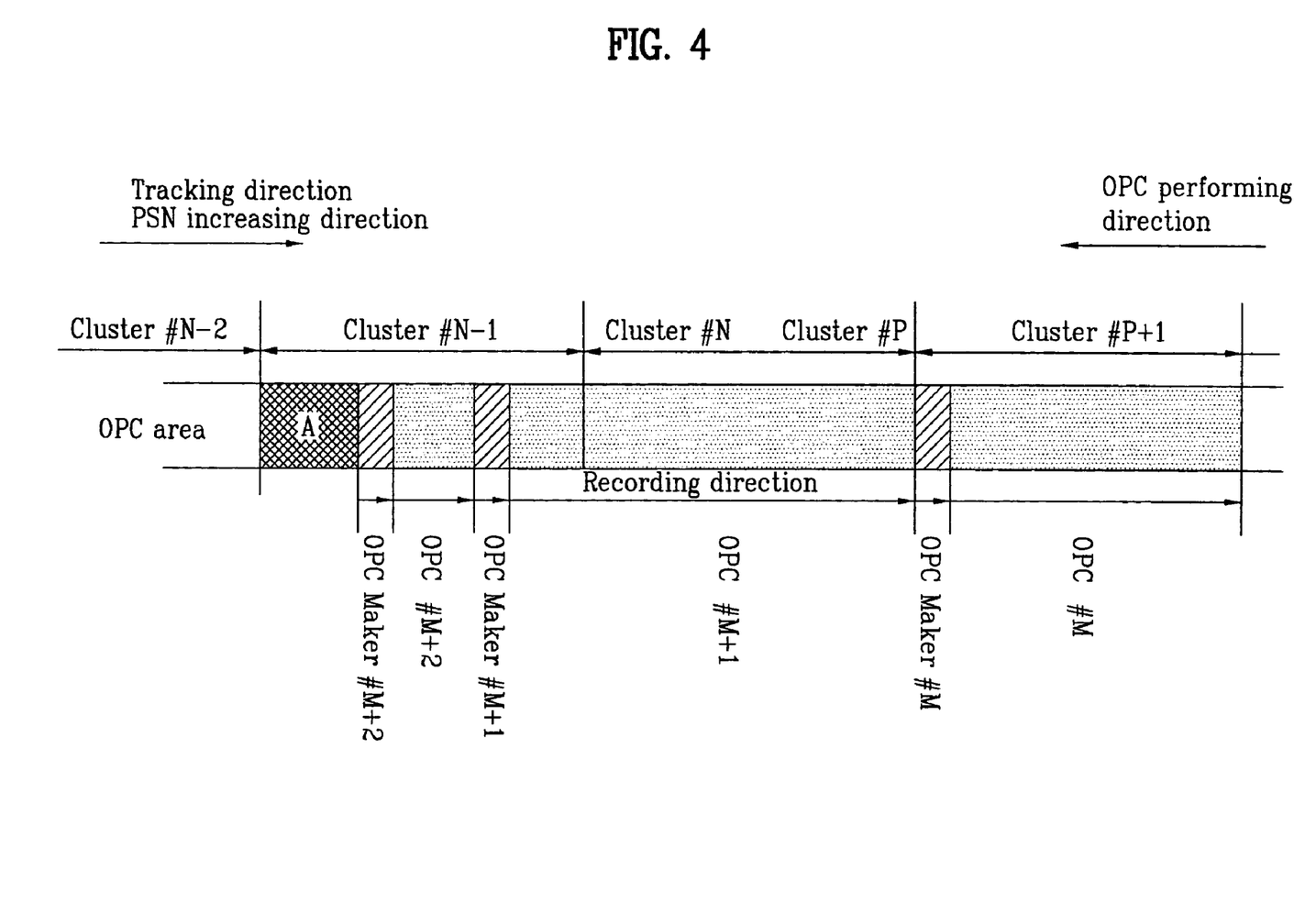
FIG. 4 is a conceptual diagram illustrating a method for performing an OPC process according to the present invention.

FIG. 4 is a conceptual diagram illustrating a method for performing an OPC process according to the present invention.

A recording-medium tracking direction of the optical recording/reproducing device in the recording medium is determined to be a Physical Sector Number (PSN) increasing direction along which the PSN is increased. The OPC-process performing direction in the recording medium is determined to be a PSN reduction direction along which the PSN is reduced in the direction from a high PSN to a low PSN.

A recording direction after the OPC process is determined to be a PSN increasing direction from a low PSN to a high PSN in the same manner as in the tracking direction.

In association with the above-mentioned description, a unit for recording data in a data area of the recording medium is a 1-cluster unit, and a unit for recording data by performing the OPC process in the OPC area may act as a 1-cluster unit. However, a data record area acquired by the OPC process may be less than the 1 cluster, and may also be larger than the 1 cluster.

In other words, a unit of data recorded to perform the OPC process is equal to an Address Unit Number (AUN). The AUN is indicative of address information used during a data record time.

It is obvious to those skilled in the art that an unused OPC area acting as a previous area formed prior to the data recording does not include the above-mentioned AUN information.

In association with the above-mentioned description, the AUN acts as a unit having a range less than that of the cluster, and a single cluster includes 16 AUNs. In more detail, a single OPC process performing length is selected by the optical recording/reproducing device, and is not limited by the number of physical clusters.

Therefore, as described above, when data acquired by the OPC process is recorded, the data is recorded in AUN units instead of cluster units. In more detail, the BD-R has a limited OPC area and cannot re-use a once-used OPC area, such that there is a need for the BD-R to maximally use the limited OPC area.

FIG. 4 shows a specific case where three OPC processes are performed. In more detail, FIG. 4 shows a plurality of parts, each of which performs the OPC process, and a plurality of OPC markers for identifying individual parts.

A part for performing a first OPC process is denoted by "Cluster #P+1", and includes a first part denoted by "OPC #M" and a second part denoted by "OPC Marker #M". The "OPC #M" part records data therein, and the "OPC Marker #M" part identifies the "OPC #M" part.

A part for performing a second OPC process includes "Cluster #P", "Cluster #N", and some parts of "Cluster #N−1". A part denoted by "OPC #M+1" records data therein, and the "OPC Marker #M+1" identifies the "OPC #M+1" part.

A part for performing a third OPC process is composed of some parts of the "Cluster #N−1" part. In more detail, the part for performing the third OPC process includes "OPC #M+2" and "OPC Marker #M+2". The "OPC #M+2" part records data therein, and the "OPC Marker #M+2" part identifies the "OPC #M+2" part. In this case, "Cluster #N−2" and some parts of the "Cluster #N−1" part positioned prior to the "OPC Marker #M+2" part serve as unused cluster areas.

In association with the above-mentioned description, the distance between two successive OPC markers from among OPC markers capable of identifying data record areas associated with the OPC process is equal to or less than a predetermined distance corresponding to 16 clusters. For example, in order to satisfy the above-mentioned requirements in the OPC process requiring at least 16 clusters, the OPC marker must be inserted into the OPC process. In this case, the above-mentioned OPC marker must have a predetermined length corresponding to at least 868 NWLs (Nominal Wobble Lengths).

The "OPC #M" part shown in FIG. 4 occupies a single cluster (i.e., 1 cluster) in the OPC area. The "OPC #M+1" part occupies a predetermined area larger than the 1 cluster in the OPC area. The "OPC #M+2" part occupies a predetermined area less than the 1 cluster in the OPC area. It can be understood that the OPC process is performed in AUN units instead of the 1 cluster unit.

Therefore, the "OPC #M+2" part recorded by the last OPC process occupies a predetermined area less than the 1 cluster in the OPC area, and the part "A" indicative of some parts of the cluster #N−1" part remains unused.

In this case, a TDDS area contained in the TDMA area storing OPC management information stores "Next Available PSN of Test Zone" information. In this case, the "Next Available PSN of Test Zone" information" information stored in the TDDS area is indicative of a start position of a cluster capable of performing the next OPC process, and may also be denoted by "Next Available first PSN of Test Zone".

The PSN is not equal to an address recorded in a disc acting as an actual recording medium, and the 1 cluster includes 32 physical sectors, such that the PSN of actually-available physical sectors is indicative of 32. A long period of time is required for searching for the actually-available physical sectors using wobbles of the disc, resulting in an increased OPC process time.

The PSN of the 1-cluster start position is mapped to an actual wobble physical address due to Least Significant Byte (LSB)—5 bits, each of which is zero, such that it can be made available.

As a result, the OPC area cannot be successively used, resulting in the occurrence of unused areas. This problem will hereinafter be described with reference to FIG. 4.

When the disc acting as a recording medium where the OPC process is performed is inserted into another optical recording/reproducing device, and is loaded in the above optical recording/reproducing device to perform the OPC process, the optical recording/reproducing device can recognize the "Next Available PSN of Test Zone" information indicative of an available address stored in cluster units on the basis of management information of the recording medium, but it cannot recognize how much information of the last cluster is used, i.e., how much information of the "Cluster #N−1" part is used.

Therefore, in the above-mentioned case, it is difficult to use the area "A" indicative of an unused area of the Cluster #N−1 as the OPC area.

Therefore, the present invention further records "Next Available PSN of Test Zone" information and specific information in the TDDS contained in the TDMA area capable of storing management information in a recording medium. In this case, the "Next Available PSN of Test Zone" information and the specific information are further recorded in the TDDS area as more detailed unit information less than the cluster unit. The "Next Available PSN of Test Zone" information is indicative of the first PSN of the next available PSNs recorded in cluster units in association with the OPC area used during the OPC process. The above-mentioned specific information indicates how much information of the last cluster from among OPC-processed clusters is used.

Therefore, the above-mentioned optical recording/reproducing device can use the OPC area using the above-mentioned specific information indicating how much information of the last cluster from among OPC-processed clusters is used, when another optical recording/reproducing device performs the OPC process, such that it can maximally use a limited OPC area.

A variety of preferred embodiments shown in FIGS. 5*a*~5*c* will hereinafter be described.

Figure 5A:
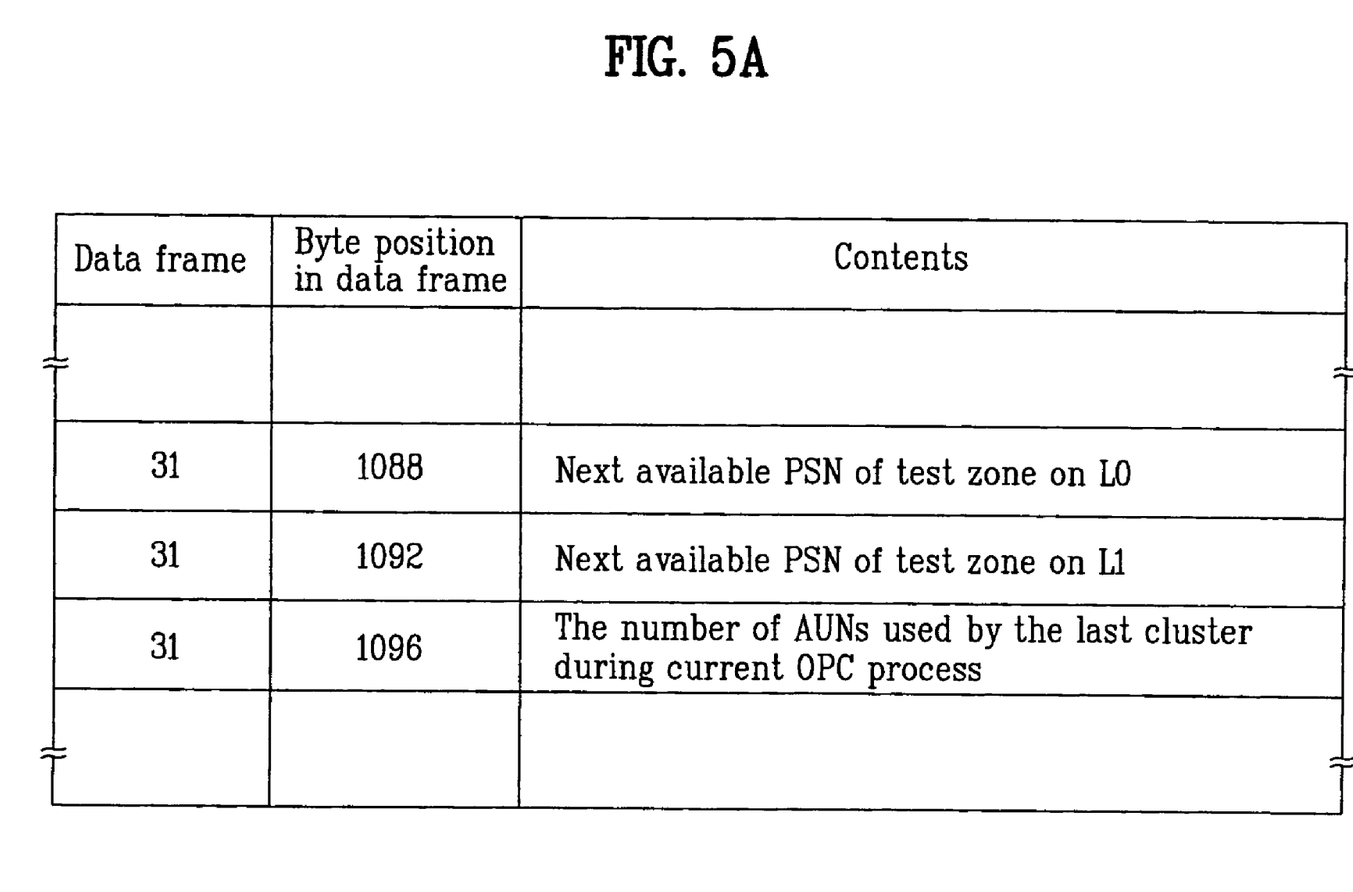
FIG. 5a shows a Temporary Disc Definition Structure (TDDS) structure of a recording medium in accordance with a first preferred embodiment of the present invention.

FIG. 5*a* shows a TDDS structure of a recording medium in accordance with a first preferred embodiment of the present invention.

A detailed structure of the TDDS will hereinafter be described with reference to FIG. 5*a*. The TDDS records various information therein, for example, "data frame", "byte position in data frame", "contents", and "Number of bytes". Specifically, the TDDS records various management information of a recording medium, for example, drive ID information from the "byte position in data frame" of 0 (i.e., TDDS identifier="DS") to the "byte position in data frame" of 1920, a manufacturer's name, an additional ID, and a unique serial number. It should be noted that FIG. 5*a* shows only some parts of the above-mentioned management information for the convenience of description.

Position information of the next available test area from among various management information recorded in the TDDS after performing the OPC process is shown in FIG. 5*a*. According to the present invention, in addition to "Next Available PSN Test Zone on L0" and "Next Available PSN Test Zone on L1", which are indicative of addresses stored in cluster units, information of a range less than that of the cluster unit is also recorded in the TDDS, such that the OPC process can be performed maximally using the unused area of the OPC area acting as a test area. Also, the number of AUNs used by the last cluster or the AUN address is recorded in the TDDS when the OPC process is performed in a predetermined area used by a current OPC process.

Therefore, if the optical disc acting as a recording medium is loaded and loaded in the optical recording/reproducing device to perform a new OPC process, the optical recording/reproducing device reads the number of AUNs used by the last cluster or an AUN address used by the last cluster when the OPC process is performed at the next available position information from among various management information recorded in the TDDS, and uses the number of AUNs and the AUN address, such that it can prevent the OPC area from being damaged during the next OPC process. In this case, the 1 cluster includes 16 AUNs.

Figure 5B:
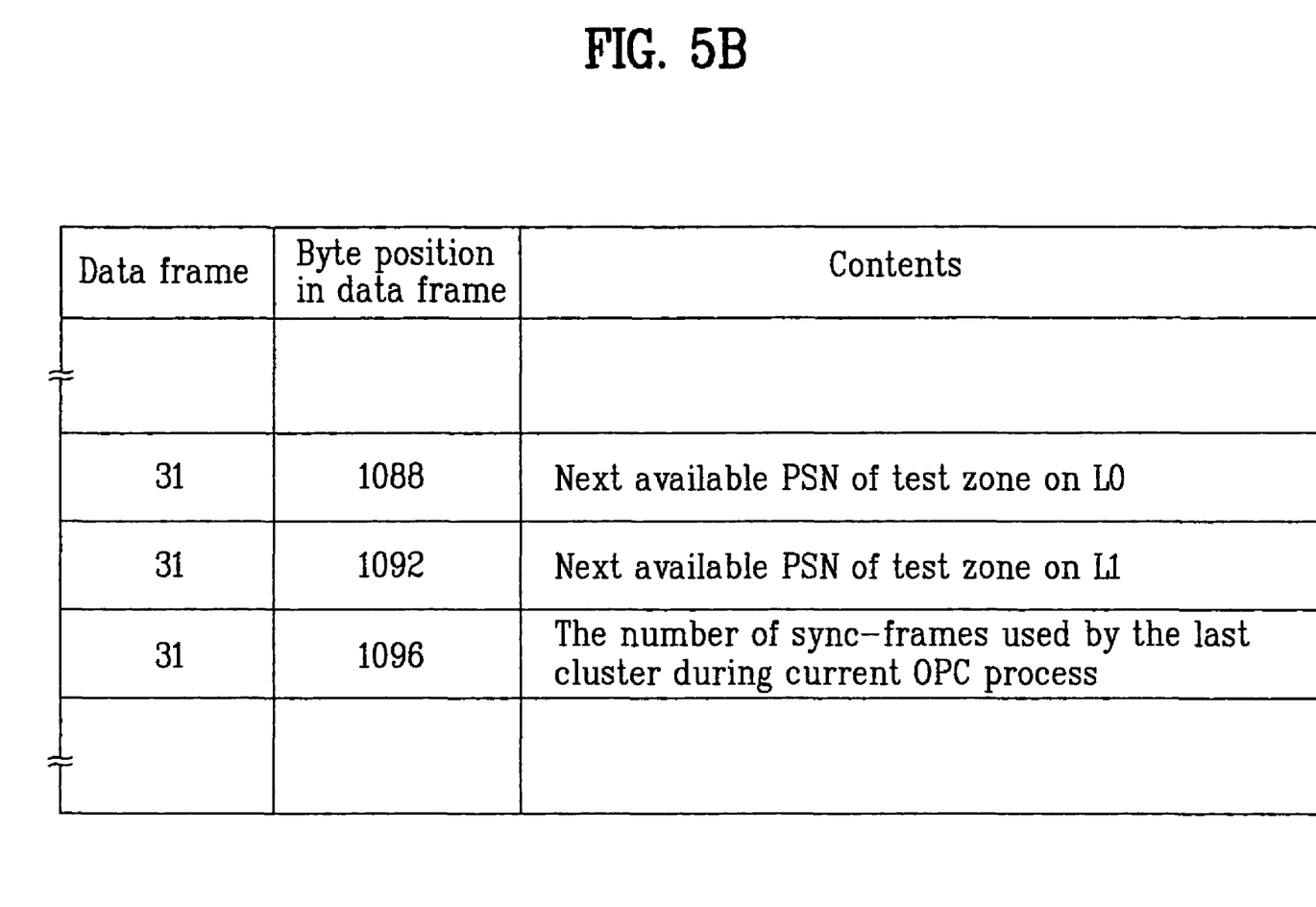
FIG. 5b shows a TDDS structure of a recording medium in accordance with a second preferred embodiment of the present invention.

FIG. 5*b* shows a TDDS structure of a recording medium in accordance with a second preferred embodiment of the present invention.

Position information of the next available test area from among various management information recorded in the TDDS after performing the OPC process is shown in FIG. 5*b*. According to the present invention, in addition to "Next Available PSN Test Zone on L0" and "Next Available PSN Test Zone on L1", which are indicative of addresses stored in cluster units, information of a range less than that of the cluster unit is also recorded in the TDDS, such that the OPC process can be performed maximally using the unused area of the OPC area acting as a test area. Also, the number of Sync frames used by the last cluster is recorded in the TDDS when the OPC process is performed in a predetermined area used by a current OPC process.

Therefore, if the optical disc acting as a recording medium is loaded and loaded in the optical recording/reproducing device to perform a new OPC process as shown in FIG. 5*a*, the optical recording/reproducing device reads the number of sync frames used by the last cluster when the OPC process is performed at the position information from among various management information recorded in the TDDS, and uses the number of AUNs and the AUN address, such that it can prevent the OPC area from being damaged during the new OPC process. In this case, the 1 cluster includes 498 sync frames.

Figure 5C:
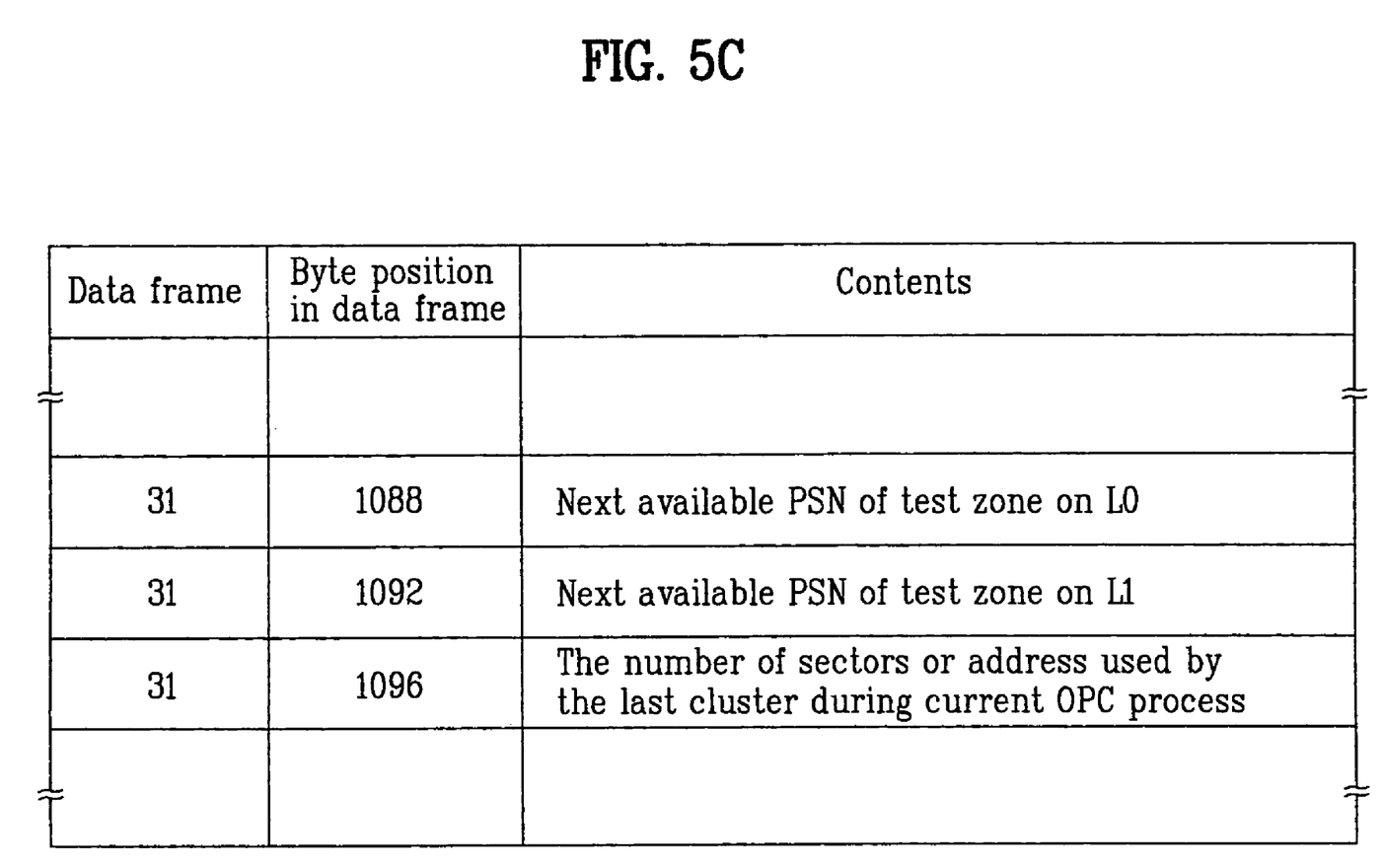
FIG. 5c shows a TDDS structure of a recording medium in accordance with a third preferred embodiment of the present invention.

FIG. 5*c* shows a TDDS structure of a recording medium in accordance with a third preferred embodiment of the present invention. For the purposes shown in FIGS. 5*a*~5*b*, the present invention uses the unused area of the TDDS along with "Next Available PSN Test Zone on L0" and "Next Available PSN Test Zone on L1", which are indicative of addresses stored in cluster units, after performing the OPC process, and performs the OPC process using the unused area of the TDDS structure. Also, the present invention records either the number of sectors used by the last cluster during the current OPC process or a sector address in the TDDS. In this case, the number of sectors used by the last cluster and the sector address are contained in the above-mentioned specific information indicating how much information of the last cluster is used when the OPC process is performed in an area of the current OPC process.

In this way, the third preferred embodiment shown in FIG. 5*c* has the same effect as those of FIGS. 5*a*~5*b*, and the 1 cluster includes 32 sectors.

In association with the above-mentioned description, the TDDS structure shown in FIGS. 5*a*~5*c* updates management information including position information whenever the OPC process is performed, such that new position information is recorded in the TDDS after the OPC process is performed.

In the case where the outer test area and the OPC area are simultaneously used as test areas in the preferred embodiments shown in FIGS. 5a~5c, or the outer test area or the OPC area is used as a test area in the same preferred embodiments shown in FIGS. 5a~5c, it is obvious to those skilled in the art that the present invention be applied to a first case in which the OPC process is performed in the outer test area and a second case in which a record area of position information associated with an available area having no test data is located at the TDDS, the position information is recorded in the TDDS, and the next OPC is performed.

The relationship among the AUN, the sync-frame, and the sector will hereinafter be described with reference to the annexed drawings.

It is understood that the information shown in FIGS. 5a~5c is similar to the OPC marker in FIG. 4, but it may be different from the OPC marker with respect to information representing address or a number of AUN, sync-frame, or sector, each of which are sub unit of cluster.

Figure 6:
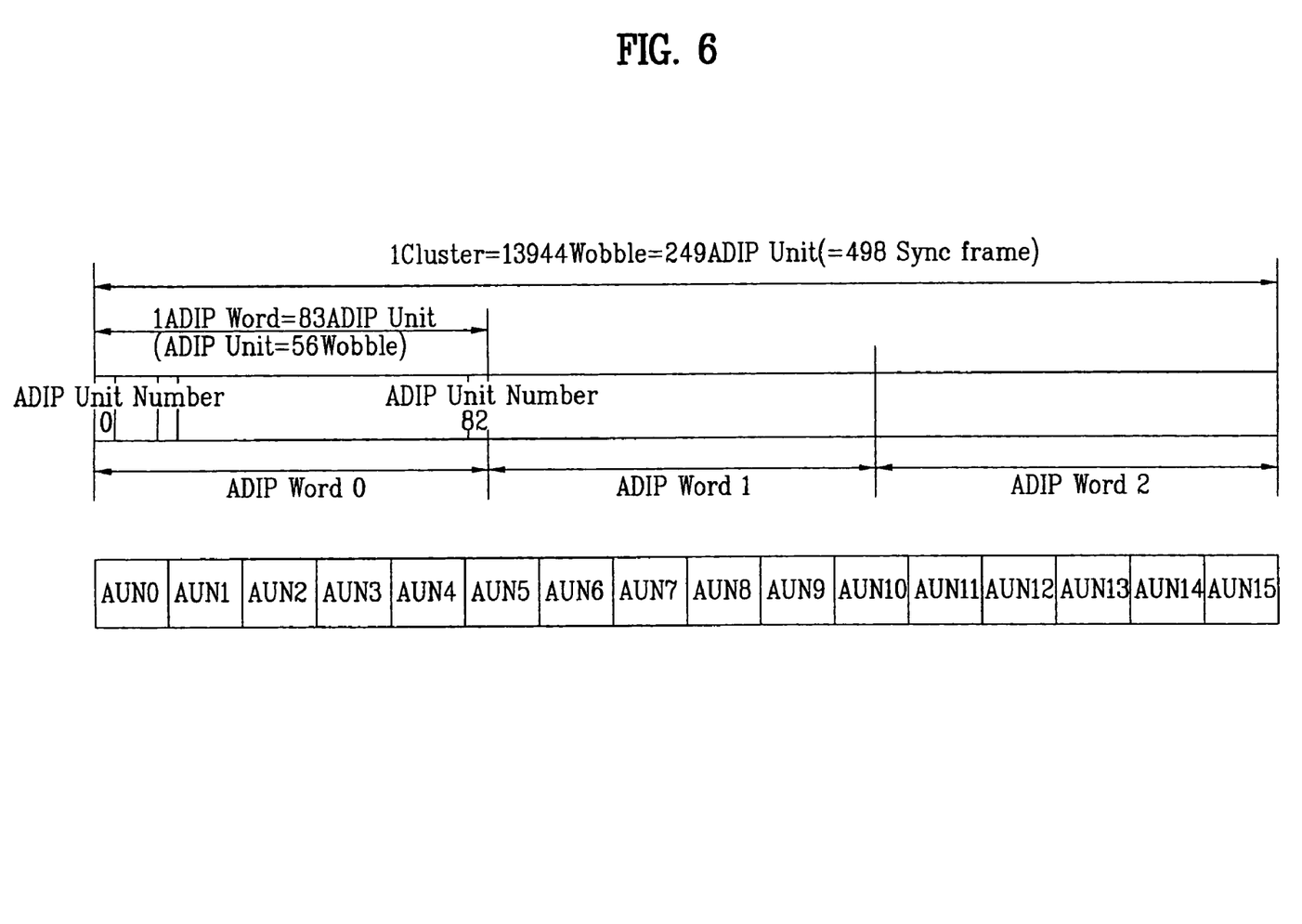
FIG. 6 shows the relationship among a 1 cluster, an Address Unit Number (AUN), a sync-frame, and a sector according to the present invention.

FIG. 6 shows the relationship among the 1 cluster, the AUN, the sync-frame, and the sector according to the present invention.

The 1 cluster indicative of some parts of the OPC area is shown in FIG. 6. The 1 cluster includes 13944 wobbles. The 1 cluster includes 3 ADIP words. Each ADIP word is composed of three ADIP words, i.e., ADIP word 0, ADIP word 1, and ADIP word 2.

Each of the ADIP words includes 83 ADIP units. The three ADIP words are equal to 249 ADIP units. Each of the ADIP units includes two sync-frames. The 249 ADIP unit is equal to 498 sync-frames. Therefore, the 1 cluster corresponds to 498 sync-frames.

The 1 cluster includes 16 AUNs. In this case, a single AUN corresponds to the length of 868 wobbles, and also corresponds to 15.5 ADIP unit. In this case, the wobble is indicative of an NWL (Nominal Wobble Length).

In addition, the 1 cluster includes 32 sectors. The PSN (Physical Sector Number) is indicative of a physical number assigned to each sector. Two sectors corresponds to a single AUN.

For example, the 1 cluster is equal to 16 AUNs, 32 sectors, and 498 sync-frames. Preferably, provided that an area recorded by the OPC process in FIG. 6 is denoted by AUN12~AUN15, the next available cluster information is recorded in the next available position information of the test area contained in the TDDS storing management information of a recording medium, and at the same time specific information (e.g., four AUNs, eight sectors, and 124.5 sync-frames) associated with the last cluster is recorded in the above-mentioned next available position information of the TDDS.

The AUN information and the sector address information can be recorded in the TDDS using the above-mentioned method.

Figure 7:
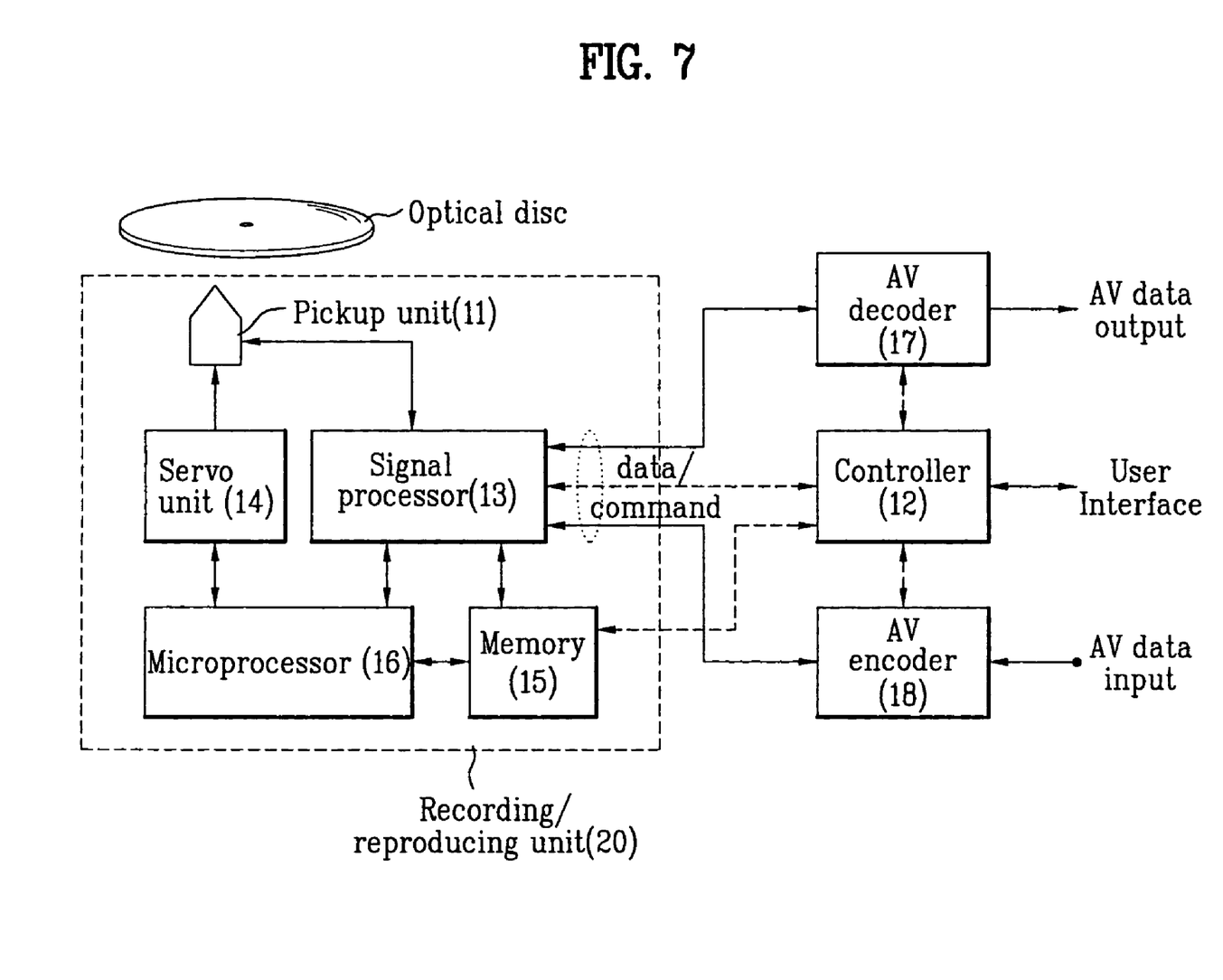
FIG. 7 is a block diagram illustrating an optical recording/reproducing device according to the present invention.

FIG. 7 is a block diagram illustrating an optical recording/reproducing device according to the present invention.

Referring to FIG. 7, the optical recording/reproducing device includes a recording/reproducing unit 20 for recording/reproducing data in/from an optical disc, and a controller 12 for controlling the recording/reproducing unit 20.

The recording/reproducing unit 20 includes a pickup unit 11, a signal processor 13, a servo unit 14, a memory 15, and a microprocessor 16. The pickup unit 11 directly records data in the optical disc, or reads data recorded in the optical disc.

The signal processor 13 receives a signal read from the pickup unit 11, restores the received signal to a desired signal value, or modulates a signal to be recorded into another signal recorded in the optical disc, such that it transmits the recovered or modulated result. The servo unit 14 controls operations of the pickup unit 11, such that it correctly reads a desired signal from the optical disc, and correctly records the signal in the optical disc. The memory 15 temporarily stores not only management information but also data. The microprocessor 16 controls overall operations of the above-mentioned components.

The above-mentioned recording/reproducing unit 20 performs a predetermined test in a test area of a recording medium, calculates an optimum write power, and records the calculated optimum write power.

In association with the above-mentioned description, the optical recording/reproducing device composed of only the recording/reproducing unit 20 is referred to as a drive, and is generally used as a peripheral device of a computer.

The controller 12 controls operations of overall constituent components. In association with the present invention, the controller 12 refers to a user command by interfacing with a user, and transmits a recording/reproducing command capable of recording/reproducing data in/from the optical disc to the recording/reproducing unit 20.

The decoder 17 decodes a signal read from the optical disc upon receiving a control signal from the controller 12, restores the decoded signal to desired information, and transmits the restored signal to the user.

The encoder 18 receives a control signal from the controller 12 to record a desired signal in the optical disc, converts the received signal into a specific-format signal (e.g., an MPEG2 transport stream), and transmits the specific-format signal to the signal processor 13.

The memory 15 reads available position information of a test area assigned to the inner area and the outer area of the recording medium from the TDDS shown in FIGS. 5a~5c, and temporarily stores the read position information.

The microprocessor 16 performs the OPC process for calculating an optimum write power in a test area recognized by the read position information stored in the memory 15, and controls data to be recorded in the recording medium according to a recording command of the controller 12 at the calculated optimum write power.

In association with the above-mentioned description, it is preferable that the position information recorded in the TDDS is set to at least one of the AUN information, the sync-frame information, and the PSN information.

Figure 8:
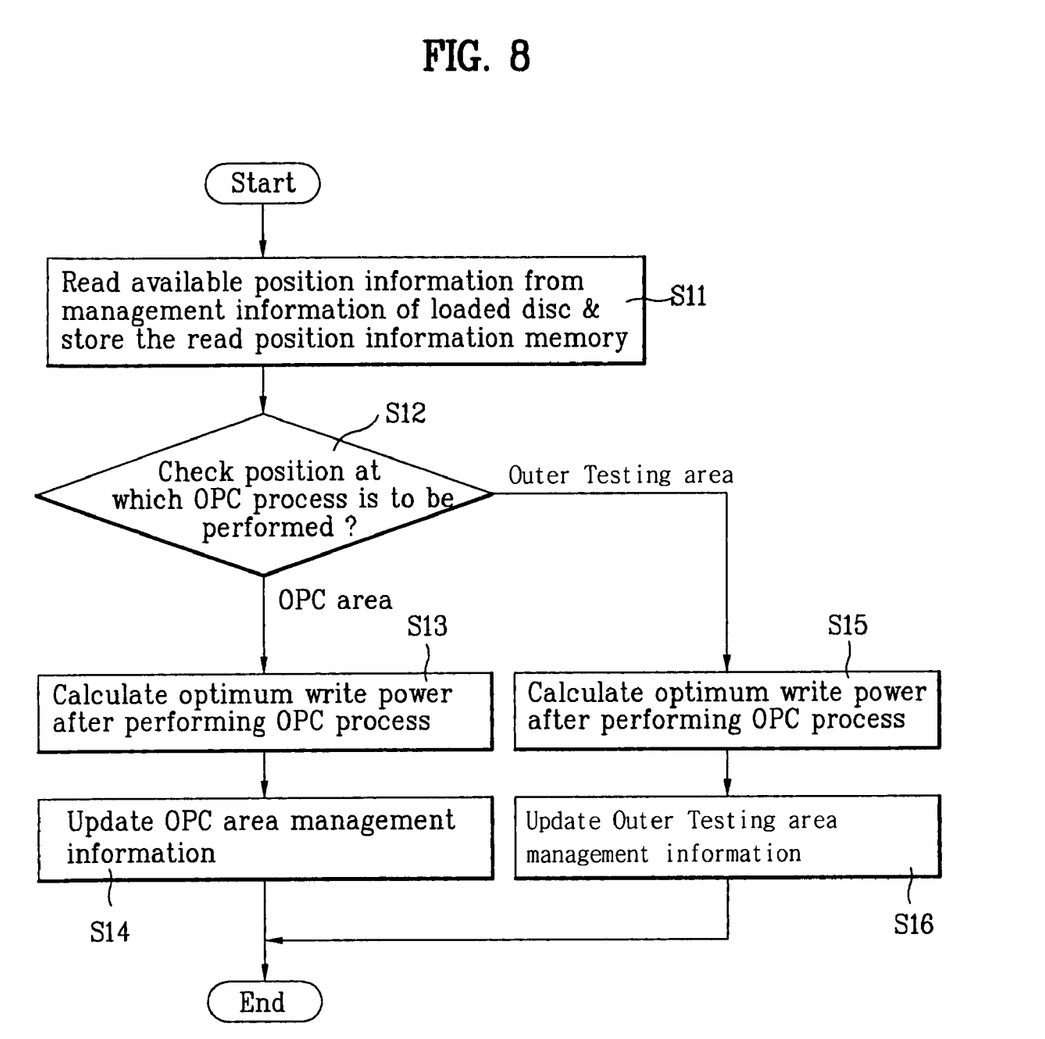
FIGS. 8~9 are flow charts illustrating a method for recording data in a recording medium according to the present invention.
Figure 9:
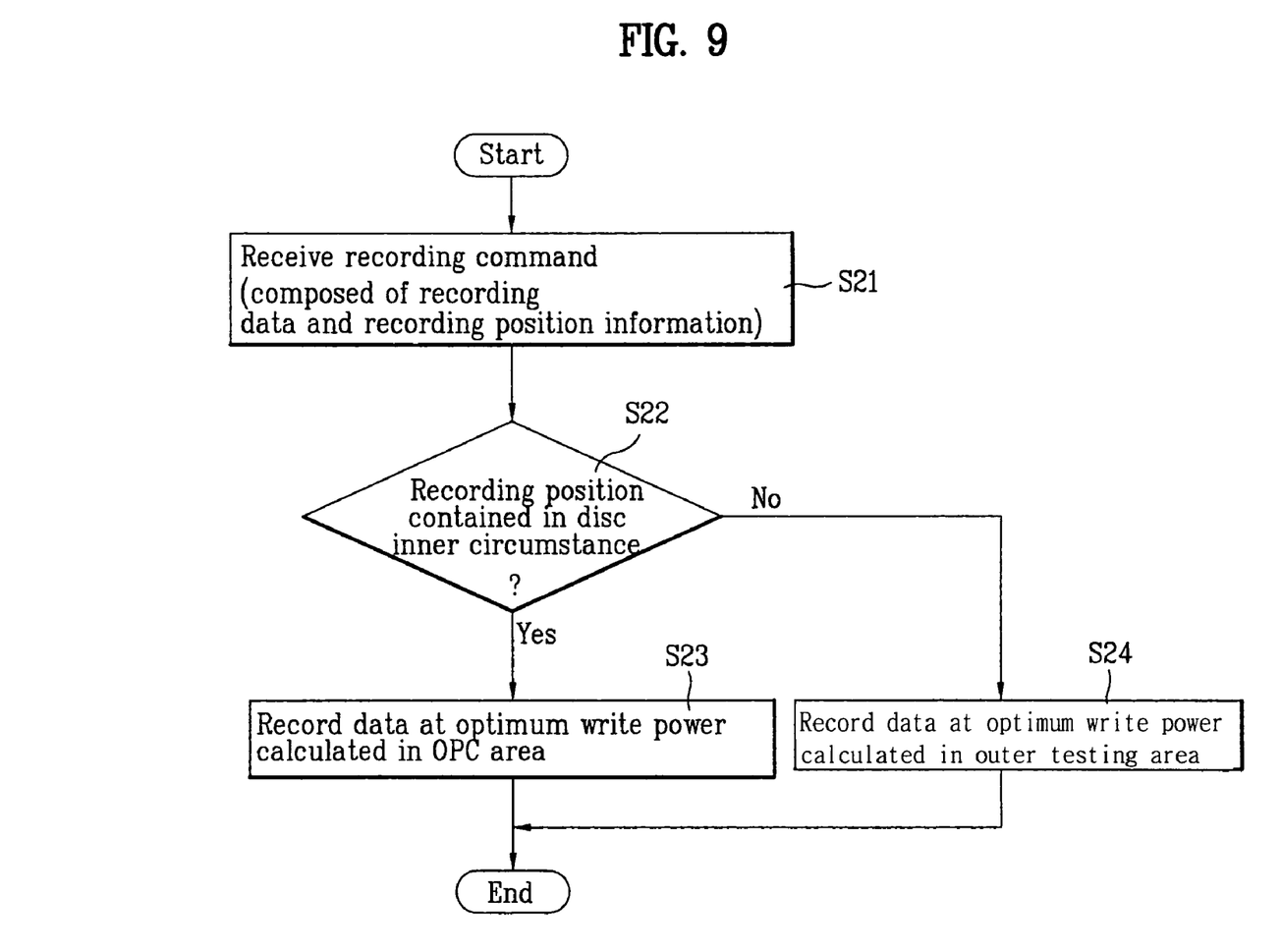

FIGS. 8~9 are flow charts illustrating a method for recording data in a recording medium using the optical recording/reproducing device according to the present invention.

Referring to FIG. 8, if the optical disc of a physical structure including the OPC area and/or the outer test area is loaded in the optical recording/reproducing device, the microprocessor 16 of the recording/reproducing unit 20 controls the pickup unit 11 using the servo unit 14, such that it reads available position information of a test area from the next available position information (e.g., "Next Available PSN of OPC", "OPC of position information used by the last cluster during the current OPC Process", "Next Available PSN of outer test area", and "outer test area of position information used by the last cluster during the current OPC Process") contained in the OPC-area management information and/or the outer test area management information at step S11, and temporarily stores the read position information in the memory 15. In this case, the OPC-area management information and the outer test area management information are recorded in the TDDS of the TDMA of the loaded disc.

Thereafter, the microprocessor 16 recognizes a correct position at which the OPC is to be performed by referring to the management information at step S12. The microprocessor 16 performs the OPC process at the position recognized by the management information upon receipt of an OPC process command. Specifically, the OPC process is performed in the OPC area and the outer test area, such that the optimum write power to be applied to the loaded optical disc is calculated in the OPC area and the outer test area, respectively, at step S13 and S15.

After steps S13 and S15 are performed, the "Next Available PSN of OPC" information, the "OPC of position information used by the last cluster during the current OPC Process" information, the "Next Available PSN of outer test area" information, and the "outer test area of position information used by the last cluster during the current OPC Process" from among various management information associated with the next OPC process position are updated such that they are used as the next available position information at steps S14 and S16.

In association with the above-mentioned description, a recording medium which includes the OPC area other than the outer test area need not the above steps S15 and S16.

Upon receiving a recording command of a corresponding disc from the controller 12, the recording/reproducing unit 20 performs the recording command using the calculated optimum write power, and a detailed description thereof will be described with reference to FIG. 9.

Referring to FIG. 9, the microprocessor 16 contained in the recording/reproducing unit 20 receives the recording command from the controller 12 at step S21. In this case, the recording command is composed of recording data and position information to be recorded in the disc at step S21. Therefore, the microprocessor 16 selects an optimum write power, at which data is to be recorded, on the basis of recording position information contained in the recording command, and determines whether the recording position is contained in the inner circumstance of the disc at step S22. If the recording position is in the vicinity of the disc inner area, the microprocessor 16 records data at the optimum write power calculated in the OPC area (i.e., the write power calculated at step S13) at step S23. If the recording position is in the vicinity of the disc outer area, the microprocessor 16 records data at the optimum write power calculated in the outer test area (i.e., the write power calculated at step S15) at step S24.

If data is recorded in the vicinity of the inner area of the data area of the disc, the microprocessor 16 uses the optimum write power calculated in the OPC area contained in the inner area. If data is recorded in the vicinity of the outer area of the data area of the disc, the microprocessor 16 uses the optimum write power calculated in the outer test area. Therefore, the present invention can properly use the optimum write power according to data recording positions.

In other words, the first optimum write power applied in the vicinity of the inner area of the disc is acquired by the result calculated in the OPC area, and the second optimum write power applied in the vicinity of the outer area of the disc is acquired by the result calculated in the outer test area, resulting in the prevention of a data record error. In this case, the data record error may occur when the same write power is applied to overall data areas during a predetermined data record time during which data is recorded in a high-density disc such as a BD at high speed.

For another example, the first optimum write power calculated in the OPC area and the second optimum write power calculated in the outer test area are not applied to the example without any change, but individual weights are applied to the first and second optimum write powers according to data recording positions to determine the last write power. Otherwise, if the data recording position is in the vicinity of the center part of the data area, a mean value of the calculated optimum write powers can also be applied to the present invention.

As apparent from the above description, a recording medium, and a method and apparatus for recording data in the recording medium according to the present invention can apply the recording medium a method for manufacturing a BD, and can effectively perform a disc test process and data recording/reproducing operations.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium including an inner area, a data area, and an outer area, comprising:
    a test area contained in at least one of the inner area and the outer area; and
    a management area for storing first and second position information, the first position information indicating a position of first data unit available for testing in the test area, the second position information indicating a position of second data unit available for testing in the position of the first data unit based on the first position information, the testing being performed in the second data unit,
    wherein first data unit includes at least two second data units, and the second data unit is at least one of a AUN (Address Unit Number) unit and a sync-frame unit.

2. The recording medium according to claim 1, wherein the test area contained in the inner area includes an Optimum Power Control (OPC) area.

3. The recording medium according to claim 1, wherein the management area is a Temporary Disc Management Area (TDMA).

4. The recording medium according to claim 3, wherein the first and second position information is stored in a Temporary Disc Definition Structure (TDDS) contained in the Temporary Disc Management Area (TDMA).

5. The recording medium according to claim 4, wherein the first and second position information in the TDDS is updated and stored.

6. The recording medium according to claim 1, wherein the first position information indicates a position information of a last first data unit in which an OPC process is performed.

7. The recording medium according to claim 1, wherein the first position information indicates a start position of a next available first data unit, wherein the first data unit is a cluster.

8. The recording medium according to claim 1, wherein the recording medium is a write-once BD-R (Blu-ray Disc Recordable).

9. A method of recording data in a recording medium, comprising the steps of:
    a) reading first and second position information of a test area assigned to the recording medium, the first and second position information being included in management information required for recording and/or reproducing of the recording medium;

b) performing an Optimum Power Control (OPC) process for calculating an optimum write power in the test area recognized by the first and second position information; and c) recording data in the recording medium using the calculated optimum write power, wherein the first position information indicates a position of first data unit available for testing in the test area, and the second position information indicates a position of second data unit available for testing in the position of the first data unit based on the first position information, the testing being performed in the second data unit, first data unit including at least two second data units, the second data unit is at least one of a Address Unit Number (AUN) unit and a sync-frame unit.

10. The method according to claim 9, further comprising the step of:

recognizing a size of an OPC area required for performing the OPC process.

11. The method according to claim 9, wherein the step b) performs the OPC by second data unit.

12. The method according to claim 9, further comprising:

recording first and second position information indicating next available position after performing the OPC.

13. An apparatus for recording data in a recording medium, comprising:

a pickup unit configured to read management information including first and second position information stored in management area, and configured to record data in the recording medium; and a controller configured to perform an Optimum Power Control (OPC) process capable of calculating an optimum write power in a test area recognized by the first and second position information, and to control the pickup unit to record data in the recording medium based on the calculated optimum write power, wherein the first position information indicates a position of first data unit available for testing in the test area and the second position information indicates a position of second data unit available for testing in the position of the first data unit based on the first position information, the testing being performed in the second data unit, first data unit including at least two second data units, and the second data unit is at least one of a Address Unit Number (AUN) unit and a sync-frame unit.

14. The apparatus according to claim 13, further comprising:

a memory configured to temporarily store the first and second position information read from the pickup unit.

15. The apparatus according to claim 13, wherein the controller is configured to recognize a size of an OPC area required for performing the OPC process.

16. The apparatus according to claim 13, wherein the controller is configured to control the pickup unit to record first and second position information indicating next available position after performing the OPC.

17. The recording medium according to claim 1, wherein the management area stores location information indicating position of the test area.

18. The method according to claim 9, wherein the management information further includes location information indicating position of the test area.

19. The apparatus according to claim 13, wherein the management information further includes location information indicating position of the test area.

* * * * *